United States Patent [19]
Childs

[11] 3,841,770
[45] Oct. 15, 1974

[54] LOCK BAR MECHANISM

[75] Inventor: Willard D. Childs, Olivenhain, Calif.

[73] Assignee: The Rucker Company, Oakland, Calif.

[22] Filed: Aug. 13, 1973

[21] Appl. No.: 388,108

[52] U.S. Cl.................. 403/106, 173/156, 403/316, 403/322
[51] Int. Cl............................................ E21b 19/00
[58] Field of Search ....... 403/11, 59, 106, 107, 108, 403/321, 322, 315, 316; 173/156; 214/2.5

[56] References Cited
UNITED STATES PATENTS

| 2,032,940 | 3/1936 | Lawrence | 403/107 X |
| 2,794,633 | 6/1957 | Delaney | 403/322 X |
| 3,469,870 | 9/1969 | Barkus | 403/107 |
| 3,675,499 | 7/1972 | Marosy | 403/315 X |

FOREIGN PATENTS OR APPLICATIONS

| 25,336 | 10/1902 | Great Britain | 403/107 |

Primary Examiner—Werner H. Schroeder
Attorney, Agent, or Firm—Lothrop & West

[57] ABSTRACT

A lock bar mechanism especially for use with a drilling mechanism having a main frame and a hook frame movable with respect to the main frame. A pair of parallel main side plates depend from the main frame. A pair of hook side plates extend upwardly from the hook frame parallel with the main side plates. The main side plates and the hook side plates have openings and apertures adapted in one position of the hook frame and the main frame to be in transverse alignment. From the main frame a support rod runs parallel to and between the hook side plates. Rotatable and rockable on the rod is a transversely extending lock bar rotatable through a limited angle by a hydraulically expansible chamber interconnected between the main frame and the lock bar. When the lock bar is out of at least some of the openings the hook frame can move relative to the main frame. When the lock bar interengages the walls of all of the side plates the weight of the hook frame is borne by the main frame. At least one of the horizontal aperture walls has a flat bottom notch closely to receiving the end of the lock bar so the lock bar cannot rotate. The lock bar is beveled to facilitate its movement relative to the apertures.

7 Claims, 3 Drawing Figures

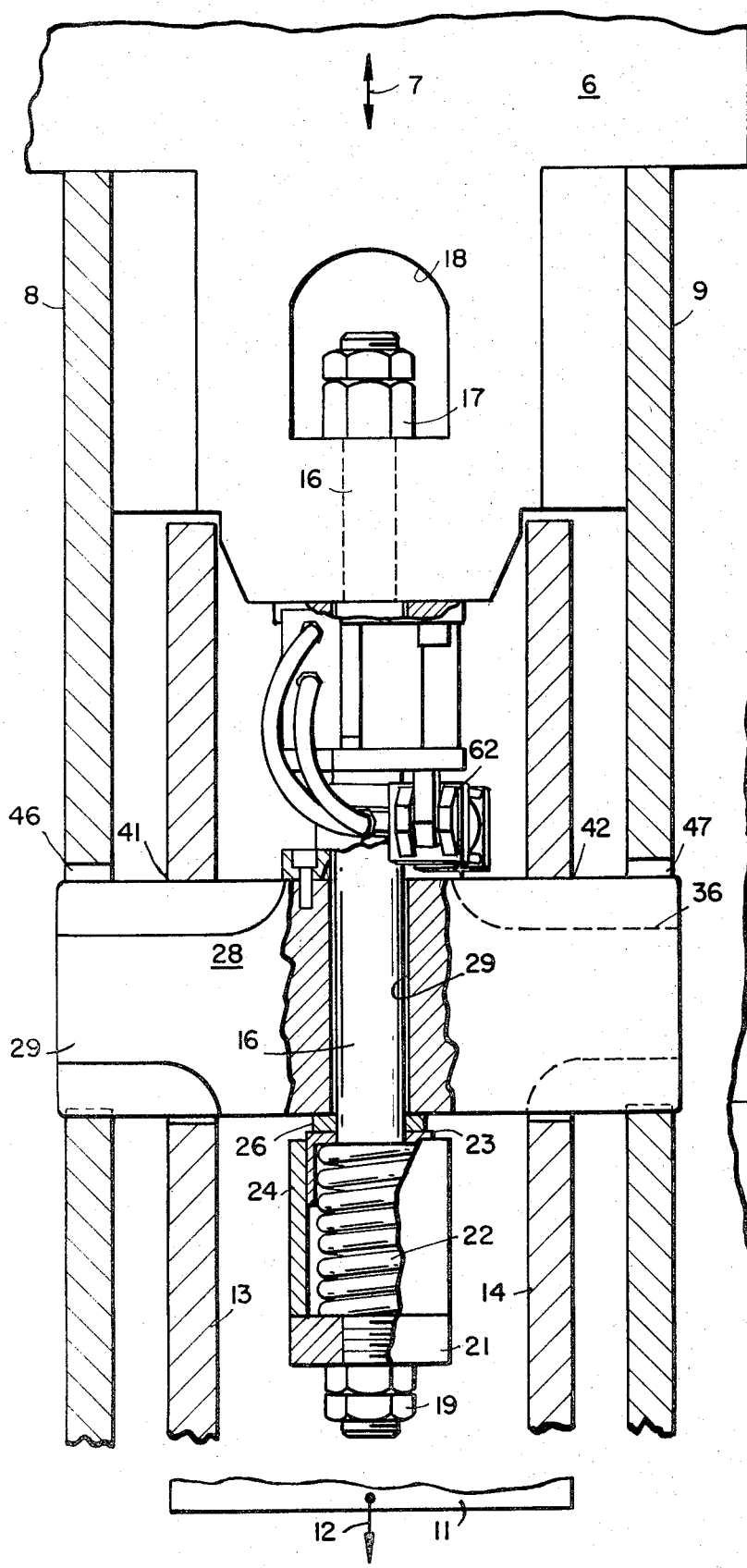
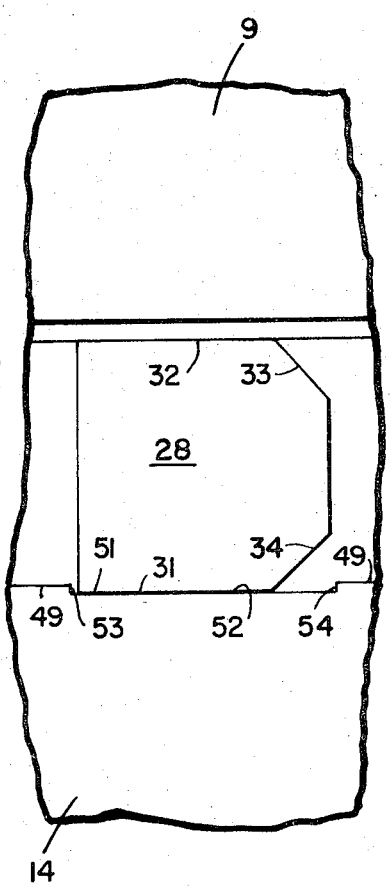

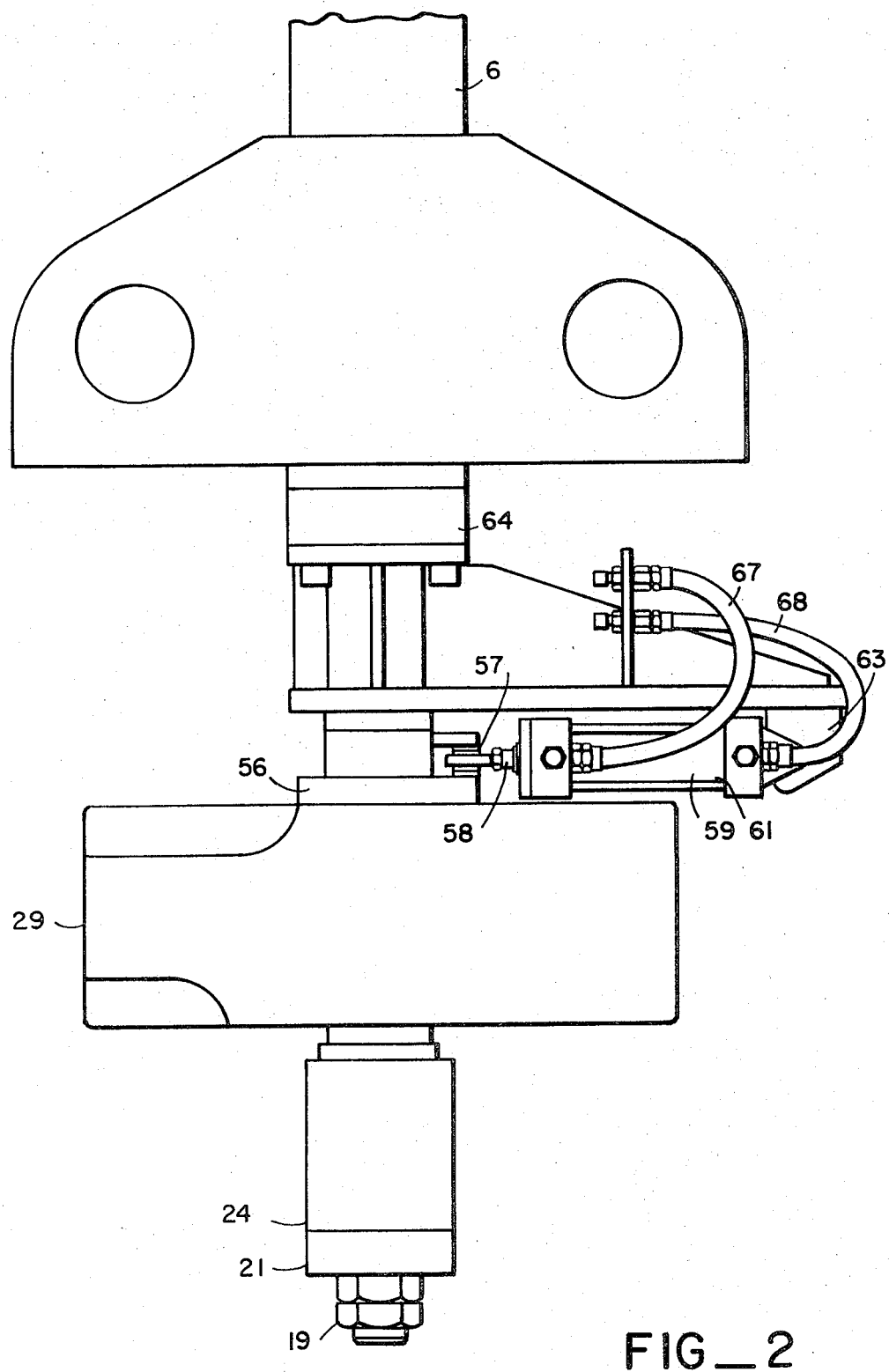
FIG_2

LOCK BAR MECHANISM

In the support of relatively heavy hook loads on a main frame such as is encountered in a drilling rig or other comparable hoisting mechanism, it is sometimes necessary to support extremely heavy loads under adverse conditions and for a protracted period of time without motion. This can be done by temporarily locking the hook frame to the main frame, but it is necessary to be able to release the hook frame from the main frame quickly and easily to resume its normal, vertical travel with respect thereto. There is a requirement for a rugged, simply manufactured, easily machined, reliable load locking and releasing mechanism occupying but a relatively small amount of space and not unduly projecting from the structure normally available. It is also requisite that the lock bar mechanism be easily engaged and disengaged and particularly that it be absolutely secure when it is in its locking position.

It is therefore an object of the invention to accomplish or meet the requirements above stated and particularly to provide a lock bar mechanism that is easily adapted to drilling mechanisms already in existence as well as to those which are newly fabricated.

Another object of the invention is to provide a lock bar mechanism that is easily made effective without the necessity of close, accurate and expensive machining.

A still further object of the invention is in general to provide an improved lock bar mechanism.

Other objects, together with the foregoing, are attained in the embodiment of the invention described in the accompanying description and illustrated in the accompanying drawings, in which:

FIG. 1 is, for the most part, a side elevation of a lock bar mechanism as it is incorporated in a drilling mechanism pursuant to the invention with parts of different structures being broken away to reveal their interior in cross-section on a generally vertical, transverse plane;

FIG. 2 is an elevation of the structure of FIG. 1 with many parts of the surrounding mechanism omitted for clarity; and FIG. 3 is a fragmentary view showing the lock bar in locking position and in end elevation, the adjacent structures being largely broken away.

In one form of drilling mechanism of large capacity there is normally supplied a main frame 6 in the nature of a massive block. The main frame is generally movable vertically in the direction of the arrow 7 in FIG. 1 and is designed to sustain very large loads imposed thereon by appropriate supporting mechanism of the usual sort, not shown. Pursuant to the invention the main frame is augmented or supplemented by the provision of a pair of main side plates 8 and 9 appropriately attached to the main frame and constituted by relatively large, flat generally rectangular bodies which depend from the main frame in generally parallel relationship to each other and on opposite sides of the center of the main frame 6.

There is also customarily provided in the drilling mechanism a hook frame 11, somewhat diagrammatically illustrated in FIG. 1, effective to sustain a load represented by an arrow 12 and imposing a downward force on the hook frame 11. Included in, forming part of and secured to the hook frame 11 are hook side plates 13 and 14 extending upwardly from the hook frame parallel to each other and parallel to the plates 8 and 9, the plates 13 and 14 being interposed between the plates 8 and 9 and in one relative vertical position of the parts overlapping the main frame plates. In much of the ordinary operation of the drilling mechanism the pairs of plates 13 and 14 are lifted and lowered in a vertical direction parallel to the arrow 7 with respect to the main frame side plates 8 and 9 so that in some positions of the parts the frame plates are spaced away from the main frame plates but in at least one other position of the parts the plates in effect overlap.

In accordance with the invention and in order to provide a satisfactory means for locking the hook frame 11 stationarily with respect to the main frame 6 in a certain relative location of those frames, I provide a support rod 16 on and as part of the main frame. The rod is an elongated, circular-cylindrical member extending along the center line of the mechanism and at its upper end is threaded so that it is located by holding nuts 17 disposed in a cutaway portion 18 of the main frame 6. The rod 16 at its lower end carries securing nuts 19 on a threaded portion of the rod. Secured in position by the nuts 19 is a disk 21 supporting the lower end of a coil spring 22 surrounding the rod 16 and at its upper end carrying a cup 23. An enclosing sleeve 24 surrounds the spring and telescopes with the flange of the cup 23.

Resting on an intervening washer 26 so that its weight is at least partially borne, under certain circumstances, by the spring 22 and ultimately on the rod 16 and the main frame 6 is a lock bar 28. The lock bar is specially fabricated pursuant to the invention and includes a generally rectangular billet of high strength material formed with a circular-cylindrical passageway 29 along the center thereof and extending through the block. The passageway 29 is somewhat larger in diameter than the diameter of the rod 16 so that while the bar is journalled on the rod for rotation about the axis thereof, the bar may also rock transversely a small amount; say two or three degrees. The lock bar, as especially shown in FIG. 3, has a generally flat bottom face 31 and a comparably flat top face 32. However, on certain adjacent edges near one end the lock bar is provided with beveled areas 33 and 34 and on the diagonally opposite portions is afforded beveled areas 36 and 37.

In one rotated position of the lock bar on the rod 16 the lock bar is effective to lie within and pass through a pair of generally rectangular, walled apertures 41 and 42 formed in the hook frame side plates 13 and 14. These apertures have generally vertical side walls and generally horizontal top and bottom walls, the latter being spaced apart slightly more than the vertical dimension of the lock bar so that there is some axial clearance or space therebetween. Similarly, the lock bar is designed to extend into openings 46 and 47 formed in the main side plates 8 and 9. The openings preferably have substantially vertical end walls and substantially horizontal flat top and bottom walls spaced apart somewhat farther than the vertical distance of the lock bar so that there is extra space or vertical clearance therebetween.

At least one of the bottom walls 49 of at least one of the openings is provided with a notch 51 defined by a relatively flat horizontal bottom wall 52 spaced slightly below the wall 49 so as to leave lateral shoulders 53 and 54 of such height that the lock bar is confined therebetween in a certain relative position of the main frame plate 9 with respect to the hook frame plate 14.

Since the lock bar is rotatable on the rod 16 relative to the main frame there is preferably provided a suitable rotating means therefor. To that end the lock bar is provided with a flange 56 carrying a pin 57 serving as a pivot connection to the end of a piston rod 58 projecting from the cylinder 59 of a hydraulically expansible chamber 61. The cylinder is connected by a fastening 62 to a bracket 63 joined to and extending from a portion 64 of the main frame 6. Appropriate hydraulic lines 67 and 68 extend from the chamber 61 to any suitable source of hydraulic fluid and control, portions of the lines 67 and 68 and the hydraulic source and controls being omitted since they are relatively standard.

In the operation of this device the hydraulic chamber 61 is usually actuated in such a fashion that the lock bar 28 is rotated about the rod 16 into such a position that the lock bar, although still perhaps occupying the apertures 41 and 42, is nevertheless free of the openings 46 and 47 and is quite clear of the main frame side plates 8 and 9. Under these circumstances the hook frame 11 can move up and down freely relative to the main frame and without any restriction. However, when the hook frame is to be locked to the main frame the parts are brought into a relative position so that the side plates 8 and 9 as well as 13 and 14 are in effect overlapped with the various openings and apertures in transverse alignment. The hydraulic chamber 61 is then actuated to rotate the lock bar 28 through a sufficient angle so that the lock bar then occupies both of the apertures and both of the openings. There is sufficient clearance in the adjacent parts so that this rotary operation can be accomplished easily, although the beveled areas 33 and 34 as well as 36 and 37 are effective in guiding the lock bar easily into locking position. When the lock bar has been so rotated then the hook frame is lowered slightly. This is sufficient to lodge the rotated lock bar in position on the flat wall 52 closely confined between the shoulders 53 and 54. The weight on the hook frame and its side plates 13 and 14 then rests on the bar 28 at the top and the bar rocks slightly, if necessary, so that such weight is transferred through the bar to rest on the main frame plates 8 and 9. Under this circumstance if the hydraulic chamber 61 should inadvertently be actuated there is still no possibility of rotating the lock bar out of position. It is first necessary for the hook frame to be raised slightly with regard to the main frame. Thereupon the actuation by the hydraulic chamber 61 is effective freely to rotate the lock bar back into its initial, non-interfering position and the hook frame is again released from the main frame.

As part of the operation of transferring the load on the hook frame through the lock bar onto the main frame, there is a slight compression of the interposed spring 22 so that there is no shock loading attended upon dropping the hook frame onto the main frame. Rather, there is a cushioned interengagement of those parts.

What is claimed is:

1. A lock bar mechanism for use with a drilling mechanism comprising a main frame, a pair of main side plates on and depending from said main frame in parallel relationship with each other, a hook frame, a pair of hook side plates on and extending upwardly from said hook frame in parallel relationship with said main side plates, means defining a pair of transversely aligned openings in said main side plates, means defining a pair of transversely aligned apertures in said hook side plates adapted to be moved into and out of transverse alignment with said openings in said main side plates, a support rod mounted on said main frame and extending parallel to and between said hook side plates, a transversely extending lock bar journalled on said support rod and rotatable between a first position with said lock bar extending through said openings and said apertures and a second position with said lock bar at least, out of said openings, and means interconnecting said main frame and said lock bar for rotating said lock bar between said first position and said second position.

2. A device as in claim 1 in which at least one of said means defining an opening includes a notch adapted to be engaged by said lock bar and to preclude rotation of said lock bar.

3. A device as in claim 1 in which said openings and said apertures have substantially horizontal, flat bottom and top walls.

4. A device as in claim 1 in which said lock bar has substantially horizontal, flat bottom and top walls.

5. A device as in claim 4 in which at least some of said walls merge with bevelled areas.

6. A device as in claim 1 in which said rotating means is an expansible hydraulic chamber.

7. A device as in claim 1 in which said lock bar is journalled loosely on said support bar for transverse rocking movement.

* * * * *